US012229200B2

United States Patent
Skiff et al.

(10) Patent No.: US 12,229,200 B2
(45) Date of Patent: Feb. 18, 2025

(54) SYSTEMS AND METHODS FOR USING LINKED DOCUMENTS

(71) Applicant: Palantir Technologies Inc., Denver, CO (US)

(72) Inventors: David Skiff, Redwood City, CA (US); Peter Wilczynski, San Francisco, CA (US); Timothy Wilson, Palo Alto, CA (US); John Carrino, Menlo Park, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/595,253

(22) Filed: Mar. 4, 2024

(65) Prior Publication Data

US 2024/0202254 A1    Jun. 20, 2024

Related U.S. Application Data

(63) Continuation of application No. 18/109,090, filed on Feb. 13, 2023, now Pat. No. 11,921,796, which is a
(Continued)

(51) Int. Cl.
*G06F 16/93* (2019.01)
*G06F 3/0481* (2022.01)
(Continued)

(52) U.S. Cl.
CPC ............ *G06F 16/94* (2019.01); *G06F 16/128* (2019.01); *G06F 16/27* (2019.01); *G06F 16/93* (2019.01);
(Continued)

(58) Field of Classification Search
CPC ........ G06F 16/94; G06F 16/128; G06F 16/27; G06F 16/93; G06F 3/0481; G06F 3/0484;
(Continued)

(56) References Cited

U.S. PATENT DOCUMENTS

| 5,548,749 A | 8/1996 | Kroenke et al. |
| 5,708,828 A | 1/1998 | Coleman |

(Continued)

FOREIGN PATENT DOCUMENTS

| AU | 2011279270 | 9/2015 |
| EP | 0 816 968 | 1/1996 |

(Continued)

OTHER PUBLICATIONS

Dell Latitude D600 2003, Dell Inc., http://www.dell.com/downloads/global/products/latit/en/spec_latit_d600_en.pdf.
(Continued)

*Primary Examiner* — Quoc A Tran
(74) *Attorney, Agent, or Firm* — Sheppard Mullin Richter & Hampton LLP

(57) ABSTRACT

Systems, methods, and non-transitory computer readable media are provided for using linked documents. A system may receive, from a computing device, a request for a document. Content of the document may be defined based on state information and stateless information. A system may determine a local replica of the document in a local database. The local replica of the document may be linked to a primary replica of the document. The local replica of the document may include a snapshot of the primary replica of the document. The primary replica of the document may be stored in a remote database which may be accessible through a remote server. The system may subscribe to the primary replica of the document through the remote server, and may provide access to the document to the computing device based at least in part on the subscription to the primary replica of the document.

20 Claims, 7 Drawing Sheets

Related U.S. Application Data continuation of application No. 17/183,065, filed on Feb. 23, 2021, now Pat. No. 11,580,173, which is a continuation of application No. 16/450,903, filed on Jun. 24, 2019, now Pat. No. 10,929,479, which is a continuation of application No. 15/835,847, filed on Dec. 8, 2017, now Pat. No. 10,380,196.

(51) Int. Cl.

| | | |
|---|---|---|
| G06F 3/0484 | (2022.01) | |
| G06F 9/54 | (2006.01) | |
| G06F 16/11 | (2019.01) | |
| G06F 16/27 | (2019.01) | |
| G06F 17/14 | (2006.01) | |
| G06Q 10/10 | (2023.01) | |
| H04L 67/01 | (2022.01) | |

(52) U.S. Cl.
CPC ............ *H04L 67/01* (2022.05); *G06F 3/0481* (2013.01); *G06F 3/0484* (2013.01); *G06F 9/543* (2013.01); *G06F 17/14* (2013.01); *G06Q 10/10* (2013.01)

(58) Field of Classification Search
CPC ......... G06F 9/543; G06F 17/14; H04L 67/01; H04L 67/1095; G06Q 10/10
See application file for complete search history.

(56) References Cited

U.S. PATENT DOCUMENTS

| | | |
|---|---|---|
| 5,765,171 A | 6/1998 | Gehani et al. |
| 5,870,761 A | 2/1999 | Demers et al. |
| 5,995,980 A * | 11/1999 | Olson ................... G06F 16/273 |
| 6,098,078 A | 8/2000 | Gehani et al. |
| 6,190,053 B1 | 2/2001 | Stahlecker et al. |
| 6,202,085 B1 | 3/2001 | Benson et al. |
| 6,216,140 B1 | 4/2001 | Kramer |
| 6,240,414 B1 | 5/2001 | Beizer et al. |
| 6,317,754 B1 | 11/2001 | Peng |
| 6,374,252 B1 | 4/2002 | Althoff et al. |
| 6,539,381 B1 | 3/2003 | Prasad et al. |
| 6,560,620 B1 | 5/2003 | Ching |
| 6,816,941 B1 | 11/2004 | Carlson et al. |
| 6,993,539 B2 | 1/2006 | Federwisch et al. |
| 7,072,911 B1 | 7/2006 | Doman |
| 7,162,501 B2 | 1/2007 | Kupkova |
| 7,167,877 B2 | 1/2007 | Balogh et al. |
| 7,437,664 B2 | 10/2008 | Borson |
| 7,519,573 B2 | 4/2009 | Helfman et al. |
| 7,536,419 B2 | 5/2009 | Liu et al. |
| 7,558,791 B2 | 7/2009 | Wahl |
| 7,596,285 B2 | 9/2009 | Brown et al. |
| 7,676,788 B1 | 3/2010 | Ousterhout et al. |
| 7,676,845 B2 | 3/2010 | Thomas et al. |
| 7,693,958 B2 | 4/2010 | Teodosiu et al. |
| 7,730,396 B2 | 6/2010 | Chidlovskii et al. |
| 7,739,240 B2 | 6/2010 | Saito et al. |
| 7,818,297 B2 | 10/2010 | Peleg et al. |
| 7,877,421 B2 | 1/2011 | Berger et al. |
| 7,953,710 B2 | 5/2011 | Novik et al. |
| 7,962,495 B2 | 6/2011 | Jain et al. |
| 7,992,082 B2 | 8/2011 | Weiss |
| 8,015,151 B2 | 9/2011 | Lier et al. |
| 8,108,933 B2 | 1/2012 | Mahaffey |
| 8,110,501 B2 | 2/2012 | Rouh |
| 8,214,353 B2 | 7/2012 | Inturi et al. |
| 8,271,436 B2 | 9/2012 | D'Souza et al. |
| 8,290,990 B2 | 10/2012 | Drath et al. |
| 8,301,904 B1 | 10/2012 | Gryaznov |
| 8,312,546 B2 | 11/2012 | Alme |
| 8,316,060 B1 | 11/2012 | Snyder et al. |
| 8,380,659 B2 | 2/2013 | Zunger |
| 8,442,940 B1 | 5/2013 | Faletti et al. |
| 8,473,908 B2 | 6/2013 | Canda et al. |
| 8,505,065 B2 | 8/2013 | Wobber et al. |
| 8,515,912 B2 | 8/2013 | Garrod et al. |
| 8,527,461 B2 | 9/2013 | Ducott, III et al. |
| 8,646,080 B2 | 2/2014 | Williamson et al. |
| 8,688,607 B2 | 4/2014 | Pacha |
| 8,688,749 B1 | 4/2014 | Ducott, III et al. |
| 8,713,418 B2 | 4/2014 | King et al. |
| 8,726,379 B1 | 5/2014 | Stiansen et al. |
| 8,782,004 B2 | 7/2014 | Ducott, III et al. |
| 8,832,131 B2 | 9/2014 | Chen et al. |
| 8,838,538 B1 | 9/2014 | Landau et al. |
| 8,863,279 B2 | 10/2014 | McDougal et al. |
| 8,874,682 B2 | 10/2014 | Lorenz et al. |
| 8,886,601 B1 | 11/2014 | Landau et al. |
| 8,984,390 B2 | 3/2015 | Aymeloglu et al. |
| 9,009,827 B1 | 4/2015 | Albertson et al. |
| 9,043,372 B2 | 5/2015 | Makkar et al. |
| 9,087,071 B2 | 7/2015 | Qian et al. |
| 9,183,289 B2 | 11/2015 | Pulfer et al. |
| 9,207,933 B2 | 12/2015 | Bostick et al. |
| 9,275,069 B1 | 3/2016 | Garrod et al. |
| 9,330,157 B2 | 5/2016 | Ducott, III et al. |
| 9,411,864 B2 | 8/2016 | Glider et al. |
| 9,449,010 B2 | 9/2016 | Wheeler et al. |
| 9,495,264 B2 | 11/2016 | Desai et al. |
| 9,656,537 B2 | 5/2017 | Dunkmann et al. |
| 9,775,379 B2 | 10/2017 | Davidson et al. |
| 9,898,703 B2 | 2/2018 | Carriere et al. |
| 10,380,196 B2 | 8/2019 | Skiff et al. |
| 2003/0084017 A1 | 5/2003 | Ordille |
| 2003/0088654 A1 | 5/2003 | Good et al. |
| 2003/0182313 A1 * | 9/2003 | Federwisch ............ G06F 16/10 |
| | | 714/E11.107 |
| 2004/0103124 A1 | 5/2004 | Kupkova |
| 2004/0111390 A1 | 6/2004 | Saito et al. |
| 2004/0250576 A1 | 12/2004 | Flanders |
| 2005/0034107 A1 | 2/2005 | Kendall et al. |
| 2005/0108063 A1 | 5/2005 | Madill et al. |
| 2005/0193024 A1 | 9/2005 | Beyer et al. |
| 2006/0036568 A1 | 2/2006 | Moore et al. |
| 2006/0106879 A1 | 5/2006 | Zondervan et al. |
| 2006/0155945 A1 | 7/2006 | McGarvey |
| 2006/0190497 A1 | 8/2006 | Inturi et al. |
| 2006/0206866 A1 | 9/2006 | Eldrige et al. |
| 2006/0218637 A1 | 9/2006 | Thomas et al. |
| 2006/0224579 A1 | 10/2006 | Zheng |
| 2007/0005707 A1 | 1/2007 | Teodosiu et al. |
| 2007/0026373 A1 | 2/2007 | Suriyanarayanan et al. |
| 2007/0112887 A1 | 5/2007 | Liu et al. |
| 2007/0168516 A1 | 7/2007 | Liu et al. |
| 2007/0180075 A1 | 8/2007 | Chasman et al. |
| 2007/0220067 A1 | 9/2007 | Suriyanarayanan et al. |
| 2007/0220328 A1 | 9/2007 | Liu et al. |
| 2007/0233756 A1 | 10/2007 | D'Souza et al. |
| 2007/0299887 A1 | 12/2007 | Novik et al. |
| 2008/0027981 A1 | 1/2008 | Wahl |
| 2008/0033753 A1 | 2/2008 | Canda et al. |
| 2008/0086718 A1 | 4/2008 | Bostick et al. |
| 2008/0141117 A1 | 6/2008 | King et al. |
| 2008/0148398 A1 | 6/2008 | Mezack et al. |
| 2008/0189240 A1 | 8/2008 | Mullins et al. |
| 2008/0235575 A1 | 9/2008 | Weiss |
| 2008/0243951 A1 | 10/2008 | Webman et al. |
| 2008/0320299 A1 | 12/2008 | Wobber et al. |
| 2009/0172821 A1 | 7/2009 | Daira et al. |
| 2009/0199090 A1 | 8/2009 | Poston et al. |
| 2009/0254970 A1 | 10/2009 | Agarwal et al. |
| 2010/0070842 A1 | 3/2010 | Aymeloglu et al. |
| 2010/0100963 A1 | 4/2010 | Mahaffey |
| 2010/0145909 A1 | 6/2010 | Ngo |
| 2010/0330801 A1 | 12/2010 | Rouh |
| 2011/0010342 A1 | 1/2011 | Chen et al. |
| 2011/0219450 A1 | 9/2011 | McDougal et al. |
| 2011/0246229 A1 | 10/2011 | Pacha |
| 2011/0252339 A1 * | 10/2011 | Lemonik ............... G06F 40/197 |
| | | 715/753 |
| 2012/0005159 A1 | 1/2012 | Wang et al. |
| 2012/0016849 A1 | 1/2012 | Garrod et al. |

(56) References Cited

U.S. PATENT DOCUMENTS

| | | | |
|---|---|---|---|
| 2012/0023075 | A1 | 1/2012 | Pulfer et al. |
| 2012/0036106 | A1 | 2/2012 | Desai et al. |
| 2012/0159385 | A1 | 6/2012 | Duncan et al. |
| 2012/0254129 | A1 | 10/2012 | Wheeler et al. |
| 2013/0006655 | A1 | 1/2013 | Van Arkel et al. |
| 2013/0006668 | A1 | 1/2013 | Van Arkel et al. |
| 2013/0067017 | A1 | 3/2013 | Carriere et al. |
| 2013/0173540 | A1 | 7/2013 | Qian et al. |
| 2013/0191336 | A1 | 7/2013 | Ducott et al. |
| 2013/0191338 | A1 | 7/2013 | Ducott, III et al. |
| 2013/0276799 | A1 | 10/2013 | Davidson |
| 2013/0346444 | A1 | 12/2013 | Makkar et al. |
| 2014/0011000 | A1 | 1/2014 | Dunkmann et al. |
| 2014/0040182 | A1 | 2/2014 | Gilder et al. |
| 2014/0040714 | A1 | 2/2014 | Siegel et al. |
| 2014/0081652 | A1 | 3/2014 | Klindworth |
| 2014/0114972 | A1 | 4/2014 | Ducott et al. |
| 2014/0129518 | A1 | 5/2014 | Ducott et al. |
| 2014/0149130 | A1 | 5/2014 | Getchius |
| 2014/0281889 | A1 | 9/2014 | Treibach-Heck |
| 2014/0324785 | A1 | 10/2014 | Gupta et al. |
| 2015/0074050 | A1 | 3/2015 | Landau et al. |
| 2015/0235334 | A1 | 8/2015 | Wang et al. |
| 2015/0261847 | A1 | 9/2015 | Ducott et al. |
| 2016/0019252 | A1 | 1/2016 | Ducott et al. |
| 2017/0315979 | A1* | 11/2017 | Boucher ............... G06F 40/14 |

FOREIGN PATENT DOCUMENTS

| | | |
|---|---|---|
| EP | 1647908 | 4/2006 |
| EP | 2911078 | 8/2015 |
| NL | 2011642 | 8/2015 |
| WO | WO 2008/113059 | 9/2008 |
| WO | WO 2011/161565 | 12/2011 |
| WO | WO 2012/009397 | 1/2012 |

OTHER PUBLICATIONS

Dou et al., "Ontology Translaation on the Semantic Web 2005," Springer-Verlag, Journal on Data Semantics II Lecture Notes in Computer Science, vol. 3350, pp. 35-37.

Fidge, Colin J., "Timestamps in Message-Passing Systems," K. Raymond (Ed.) Proc. of the 11th Australian Computer Science Conference (ACSC 1988), pp. 56-66.

Holliday, JoAnne, "Replicated Database Recovery using Multicast Communication," IEEE 2002, pp. 11.

Lamport, "Time, Clocks and the Ordering of Events in a Distributed System," Communications of the ACM, Jul. 1978, vol. 21, No. 7, pp. 558-565.

Loeliger, Jon, "Version Control with Git," O'Reilly, May 2009, pp. 330.

Mattern, F., "Virtual Time and Global States of Distributed Systems," Cosnard, M., Proc. Workshop on Parallel and Distributed Algorithms, Chateau de Bonas, France:Elsevier, 1989, pp. 215-226.

O'Sullivan, Bryan, "Making Sense of Revision Control Systems," Communications of the ACM, Sep. 2009, vol. 52, No. 9, pp. 57-62.

OWL Web Ontology Language Reference Feb. 2004, W3C, http://www.w3.org/TR/owl-ref/.

Parker, Jr. et al., "Detection of Mutual Inconsistency in Distributed Systems," IEEE Transactions in Software Engineering, May 1983, vol. SE-9, No. 3, pp. 241-247.

Symantec Corporation, "E-Security Begins with Sound Security Policies," Announcement Symantec, Jun. 14, 2001.

M. Tamer Ozsu et al: "Principles of Distributed Database Systems—Chapter 13—Data Replication" In: M. Tamer Ozsu et al: "Principles of Distributed Database Systems, Third Edition", Mar. 2, 2011 (Mar. 2, 2011), Springer New York, New York, NY, XP055319953, ISBN: 978-1-4419-8834-8 pp. 459-495, DOI: 10.1007/978-1-4419-8834-8 13.

Anonymous: "Kerberos (protocol)—Wikipedia", Oct. 26, 2017 (Oct. 26, 2017), XP055557225, Retrieved from the Internet: URL:https://en.wikipedia.org/w/index.php?title=Kerberos_(protocol)&oldid=807224970 [retrieved on Feb. 14, 2019].

Non-Final Office Action dated Aug. 16, 2022, issued in related U.S. Appl. No. 17/183,065 (26 pages).

Non-Final Office Action dated Jun. 25, 2020, issued in related U.S. Appl. No. 16/450,903 (24 pages).

First Action Interview Pilot Program Pre-Interview Communication dated Mar. 28, 2018, issued in related U.S. Appl. No. 15/835,847 (5 pages).

Non-Final Office Action dated Aug. 31, 2018, issued in related U.S. Appl. No. 15/835,847 (30 pages).

Notice of Allowance mailed Apr. 3, 2019, issued in related U.S. Appl. No. 15/835,847 (12 pages).

Extended European Search Report dated Mar. 19, 2019, issued in related European Patent Application No. 18211177.3 (11 pages).

Examination Report dated Jan. 20, 2021, issued in related European Patent Application No. 18211177.3 (6 pages).

Non-Final Office Action mailed Jul. 20, 2023, issued in related U.S. Appl. No. 18/109,090 (18 pages).

* cited by examiner

SYSTEMS AND METHODS FOR USING LINKED DOCUMENTS

CROSS REFERENCE TO RELATED APPLICATIONS

This application is a continuation of U.S. patent application Ser. No. 18/109,090, filed Feb. 13, 2023, which is a continuation of U.S. patent application Ser. No. 17/183,065, filed Feb. 23, 2021, now U.S. Pat. No. 11,580,173 B2, which is a continuation of U.S. patent application Ser. No. 16/450,903, filed Jun. 24, 2019, now U.S. Pat. No. 10,929,479 B2, which is a continuation of U.S. patent application Ser. No. 15/835,847, filed Dec. 8, 2017, now U.S. Pat. No. 10,380,196, the contents of which is hereby incorporated by reference in its entirety into the present disclosure.

FIELD OF THE INVENTION

This disclosure relates to approaches for using linked documents.

BACKGROUND

Under conventional approaches, a document may be stored in a database and be accessible for viewing and/or editing. Content of a document may be defined based on stateless information (e.g., stateless assets, such as images, that do not change between versions of the document) and/or state information (e.g., different operational transforms being applied to one or more portions of different versions of the document). Restricting content of the document to stateless information may limit the flexibility and versatility of the document. For example, restricting content of the document to images may require changes in the actual images used for the document (e.g., uploading different images) to change the content of the document. Using state information to define content of the document may provide for more flexible/versatile content changes. For example, operational transforms being applied to the document may be changed (e.g., adding, removing, and/or modifying one or more operations) to change the content of the document.

However, using state information to define content of the document may result in mismatch between different copies of the document based on a mismatch in state information. For example, changes in state information may not be propagated to different locations (e.g., databases, servers) at which copies of the document are stored, and the content of the document may be different based on the location from which the copy of the document is accessed. Providing clients in different locations with access to up-to-date state information for the documents may be desirable for a number of reasons. For example, providing up-to-date state information can enable a live view of the document (e.g., view updated version of document) and collaboration using the same version of the document by clients in different locations. Further, providing up-to-date state information can enable views of the same version of the document through different computing devices/at different times.

SUMMARY

Various embodiments of the present disclosure may include systems, methods, and non-transitory computer readable media configured to provide for use of linked documents. Various embodiments of the present disclosure may include systems, methods, and non-transitory computer readable media configured to receive, from a computing device, a request for a document. Content of the document may be defined based on state information and stateless information. A computing system may determine a local replica of the document in a local database. The local replica of the document may be linked to a primary replica of the document. The local replica of the document may include a snapshot of the primary replica of the document. The primary replica of the document may be stored in a remote database which may be accessible through a remote server. The computing system may subscribe to the primary replica of the document through the remote server, and may provide access to the document to the computing device based at least in part on the subscription to the primary replica of the document.

In some embodiments, the subscription to the primary replica of the document may include one or more updates to the snapshot of the primary replica of the document. The subscription to the primary replica of the document may include one or more updates to the state information for the document. In some embodiments, the stateless information may be locally stored.

In some embodiments, providing access to the document to the computing device may include receiving one or more edits to the document from the computing device, and transmitting information describing the edit(s) to the remote server. The remote server may have ultimate editorial control over the primary replica of the document.

In some implementations, the computing device may be logged into the computing system using a given credential, and the computing system's access to the primary replica of the document through the remote server may be validated using the given credential. The given credential may be validated based on trust relationships between an exchanger and authentication processes.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
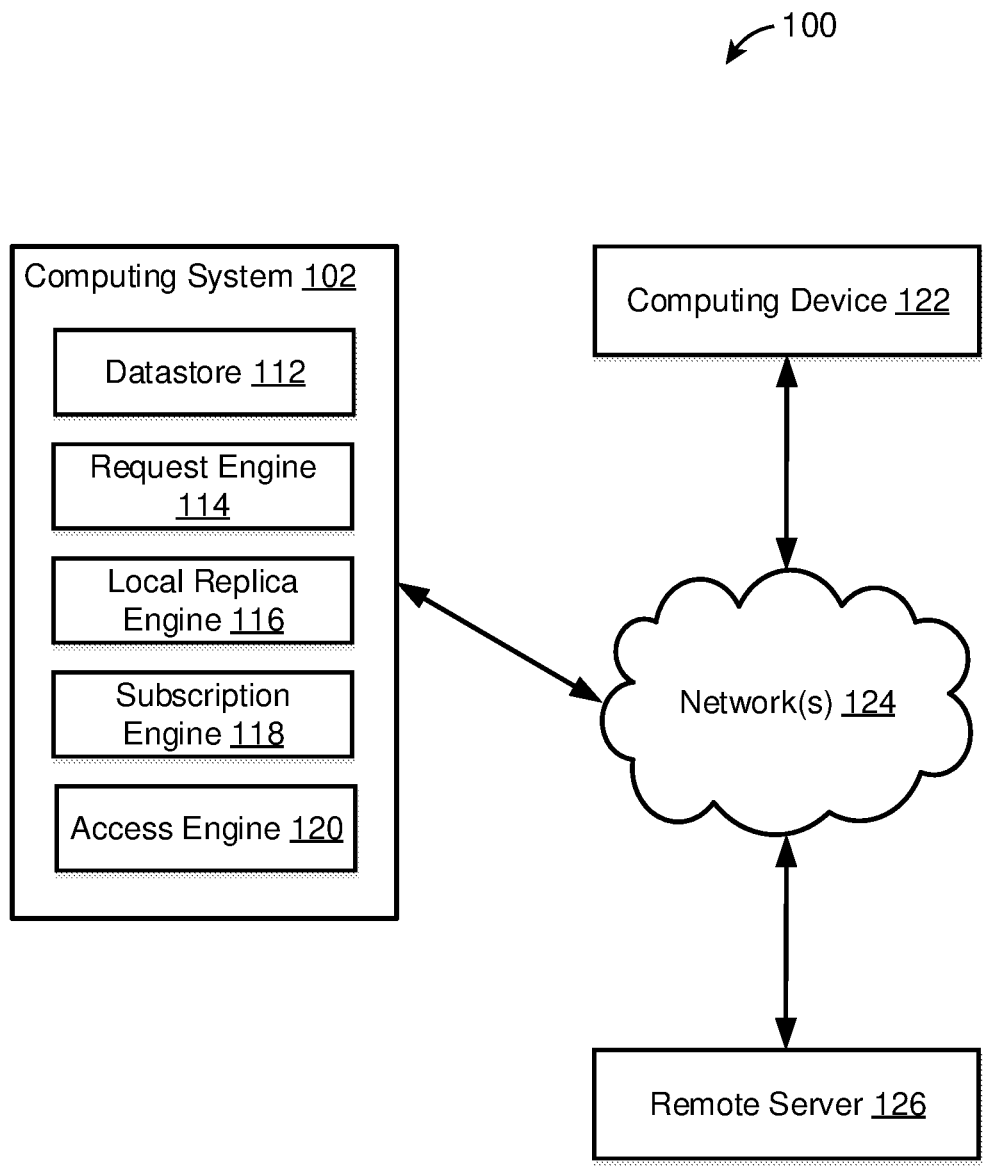
FIG. 1 illustrates an example environment for using linked documents, in accordance with various embodiments.

A claimed solution rooted in computer technology overcomes problems specifically arising in the realm of computer technology. In various implementations, a computing system may receive, from a computing device, a request for a document. Content of the document may be defined based on state information and stateless information. For example, in some embodiments, content of the document may be determined using an operational transform model that performs operations using state information and stateless information. When processing the request, the computing system may find a local replica of the document in a local database. In some embodiments, the local replica of the document may be linked to a primary replica of the document. For example, a field in the local replica of the document may identify or reference the primary replica of the document. In some embodiments, the local replica may include a snapshot (serialized state) of the primary replica of the document. The primary replica of the document may be stored in a remote database and may be accessible through a remote server. In some embodiments, the remote server may have ultimate editorial control over the primary replica of the document.

The computing system may subscribe to the primary replica of the document through the remote server and may provide access to the document to the computing device from which the request was received, for example, based on the subscribed primary replica of the document. The computing system, which acts as a server to the computing device, may become a client of the remote server for purposes of accessing the primary replica of the document.

In some embodiments, the subscription to the primary replica of the document may include one or more updates to the snapshot of the primary replica of the document. The computing system may update the snapshot of the primary replica of the document in the local replica of the document while continuing to subscribe to the primary replica of the document.

In some embodiments, the subscription to the primary replica of the document may include one or more updates to the state information for the document. The computing system may receive update(s) to the state information (e.g., additional operations to be performed) for the document so that the computing system may provide an updated replica of the document to the computing device.

In some embodiments, the stateless information may be locally stored. For example, the document may include one or more layers defined by stateless assets and provision of the document to the computing device may include provision of locally stored stateless assets. Such provisioning of stateless information may reduce the costs (e.g., network bandwidth, computer processing) required to provide the document to the computing device.

In some embodiments, providing access to the document to the computing device may include receiving one or more edits to the document from the computing device and sending information describing the edit(s) to the remote server. For example, information describing the edit(s) to the document, as received from the computing device, may be cached by the computing system and sent to the remote server for potential modification of the primary replica of the document.

In some implementations, the computing device may be logged into the computing system using a given credential (e.g., token). In some embodiments, the computing system's access to the primary replica of the document through the remote server may be validated using the given credential. The given credential may be validated based on trust relationships between an exchanger and one or more authentication processes. Such validation of the computing device may allow a user of the computing device to access the primary replica of the document by going through an authentication/authorization process corresponding to the computing system and without going through a separate authentication/authorization process corresponding to the remote server.

The approaches disclosed herein enable access to a given document (e.g., data object) from multiple locations (e.g., geo-replicating a live view of data objects) and allow for collaborative document usage (e.g., collaborative document editing). Users/clients are able to access local replicas of documents maintained by local servers, which become clients of remote servers maintaining primary replicas of documents. Rather than simply replicating static views of data objects (e.g., at periodic intervals), an operational transform framework provides for live views of documents. Such live views of documents may be provided in conjunction with periodic updates for documents.

In general, a document may refer to a collection of information. For example, a document may refer to a collection of visual information (e.g., text, image, video), audio information (e.g., sound recording, music), and/or other information. A document may be represented as one or more electronic files. In some instances, information within a document may be organized with other information or separately from other information. For example, a document may include a marked-up (or annotated) map with different information (e.g., image information, marking information) stored within different layers that define the marked-up map (e.g., base map defined by stateless information, markings on the map defined by state information). While the disclosure is described herein with respect to documents containing maps, this is merely for illustrative purposes and is not meant to be limiting. The techniques described herein may be applied to other types of documents, other types of information defining content of documents, and other organizations. Many variations are possible.

FIG. 1 illustrates an example environment 100 for using linked documents, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., via one or more network(s)). In some embodiments, the datastore(s) may include various databases, application functionalities, application/data packages, and/or other data that is available for download, installation, and/or execution.

In various embodiments, the computing system 102 may include a datastore 112, a request engine 114, a local replica engine 116, a subscription engine 118, and an access engine 120. The datastore 112 may include structured and/or unstructured sets of data that can be divided/extracted for provisioning when needed by one or more components of the environment 100. The datastore 112 may include one or more databases (e.g., storing document information, such as state information, stateless information, operation logs). The datastore 112 may include different data analysis/processing modules that facilitate different data analysis/processing tasks, and/or other information to be used in the environment 100. While the computing system 102 is shown in FIG. 1 as a single entity, this is merely for ease of reference and is not meant to be limiting. One or more components/functionalities of the computing system 102 described herein may be implemented in a single computing device or multiple computing devices.

In various embodiments, the request engine 114 is configured to receive from a computing device, a request for a document. For example, the computing system 102 may include a server and may receive a request for a document from a computing device 122 (e.g., desktop device, laptop, mobile device) over one or more networks 124 (e.g., the Internet). In some embodiments, the computing device 122 (or a user operating the computing device 122) may have to be logged into the server (e.g., authenticated, authorized) to request the document and/or for the computing system 102 to provide the computing device 122 with access to the document.

In some embodiments, content of a document may be defined based on state information, stateless information, and/or other information. For example, content of the document may be determined using an operational transform model that performs operations using state information and stateless information. However, other well-known models for defining content of the document may be utilized.

Stateless information may refer to information that corresponds to content for a document that does not change with time/between versions of the document. For example, stateless information may include visual information (e.g., defining images, videos), audio information (e.g., defining sound clips, music), and/or other information that does not change with time/between versions of the document. Further, stateless information may include stateless assets for defining contents of a document. In some embodiments, stateless information may be stored locally. That is, stateless information may be stored locally with the document/replica of the document that uses the stateless information. For example, a document/replica of the document may be stored within an electronic storage/database (e.g., such as within the datastore 112) of the computing system 102 and the stateless information may be stored within the same electric storage/database and/or other electronic storage/database of the computing system 102.

State information may refer to information defining content for a document that may change with time/between versions of the document. State information may include operations that may be performed on the document to define the content of the document and/or other information that may change with time/between versions of the document. Such operations may be performed with respect to an image defined by stateless information or over an image defined by stateless information, for example. State information may define one or more objects that are being edited in the document. For instance, referring to the example of a document including a marked-up map, a base map within the document may be defined by stateless information (e.g., satellite image(s) of one or more locations) while markings on the map (e.g., annotations, directions/routes) may be defined by state information (e.g., operational transforms performed on one or more portions/layers of the document). As another example, one or more operations on the document may include importing information from other document(s) (e.g., importing annotations from one or more other documents/maps into the document/map(s) in the document).

In some embodiments, operations to be performed on the document may be recorded within one or more operation logs. Based on the operation log(s), multiple computing devices may present the same view of documents. An operation log may contain information to enable a computing device (e.g., the computing system 102, the remote server 126) to perform (replay) operations on top of a snapshot (serialized state) of a document to arrive at a consistent state. Individual computing devices (e.g., servers) may maintain their own operation logs for the document. For example, a document may include a map with markings on the map defined by an operation log (including one or more operational transforms). Multiple users in different locations (e.g., accessing the document through different servers/databases) may see and collaborate on the same view of the map by replicating the operation log.

Updates to operation logs (maintained by different servers in different locations) may effectuate updates to state information. In some embodiments, operations to be performed on the document may be commutative, and the operations may be applied optimistically on the front end. Such application of operations on the document may provide for a resilient document management system and assist users to avoid conflicts within different replicas of documents being accessed.

Multiple replicas of a document may be stored within different locations. A replica may refer to a copy of a document. For example, multiple replicas of a document may be stored within electronic storage/databases of computing devices (e.g., servers) in different locations. Multiple replicas of the document may be used by users in different locations to access the same view of the map. For example, multiple replicas of the document may be used by users in different locations to access the same version of the map. Replicas of a document may identify or reference a single version of the document or multiple versions of the document. For example, a single replica of a document may be used to access different versions of the document or different replicas of a document may exist for different versions of the document.

Multiple replicas of the document may include a primary replica of the document and one or more local replicas of the document. The primary replica of the document may refer to the replica of the document that is maintained by a computing device having ownership of the document (e.g., the replica stored within a database of a local/remote server that has ultimate editorial control over the document). For example, the computing system 102 may maintain a primary replica of a given document within the datastore 112 and changes to the primary replica of the given document may be recorded within an operation log (stored in the datastore 112 and/or other electronic storage of the computing system 102).

A local replica of the document may refer to a copy of the document that is maintained by a computing device not having ownership of the document (e.g., the replica stored within a database of a local server that does not have ultimate editorial control over the document). For example, the computing system 102 may maintain a local replica of a particular document in the datastore 112 and changes to the local replica of the particular document may be recorded within an operation log (stored in the datastore 112 and/or other electronic storage of the computing system 102). The changes to the local replica of the particular document may not be confirmed (e.g., accepted into the primary replica of the document) until the changes are acknowledged by a computing device (e.g., a remote server) having ownership of the document. In some embodiments, changes to a local replica of a particular document may result in generation of a new version of the particular document.

The local replica of the document may be linked to the primary replica of the document. One or more fields in the local replica of the document may identify or reference the primary replica of the document. The fields may include information to identify/locate the primary replica of the document/the computing device maintaining the primary replica of the document. For example, the local replica of the particular document in the datastore 112 may include field(s) that identify/may be used to identify the document as originating from/owned by a remote server 126. The local replica of the particular document in the datastore 112 may also include field(s) that identify/may be used to identify the identifier (e.g., document ID) of the primary replica of the document in the database of the remote server 126.

In some situations, the primary replica of the document may be stored in a remote database which may be accessible through a remote server (e.g., the remote server 126). For example, a user may login to a local server (e.g., the computing system 102) to open the local replica of the document (e.g., stored in the datastore 112). Based on the user's opening of the local replica of the document, the local server may communicate with the remote server (e.g., the remote server 126) to retrieve information (e.g., updates to an operation log) from the primary replica of the document to update the local replica of the document. Such linkage between the primary and local replicas of the document may provide for a dependency relationship between the primary and local replicas of the documents, where the local replica of the document depends on the primary replica of the document to determine what content is ultimately included in the document.

In some embodiments, the local replica of the document may include a snapshot (serialized state) of the primary replica of the document, which may be used to provide a view of the document when access to the primary replica of the document is not available (e.g., due to a network partition or other connectivity issues). For example, the local replica of the particular document stored in the datastore 112 may include a snapshot of the primary replica of the document, which allows the computing system 102 to provide a view of the document when the computing system 102 cannot communicate with the remote server (e.g., the remote server 126) maintaining the primary replica of the document.

The primary replica of the document may be maintained by a computing device having ultimate editorial control over the document. For example, a remote server may maintain the primary replica of a given document and may have ultimate editorial control over the primary replica of the given document (e.g., via use of one or more global commit logs accessible through a version control system). That is, the remote server may determine what changes to the primary replica of the document will be accepted and change the primary replica of the document. These changes may be made directly to the primary replica of the document or made to a local replica of the document, for example. Changes made to the primary replica of the document by the remote server may be propagated to computing devices maintaining local replicas of the document. In some embodiments, the ownership of the document may be changed. For example, the ownership of a particular document may change from the remote server 126 to the computing system 102 or the ownership of a given document may change from the computing system 102 to the remote server 126. Many variations are possible!

In some embodiments, a local replica of a document may be created based on sharing of a document. For example, rather than sharing a static version of the document, a user may choose to allow remote access to the document (e.g., by the same user, by different user(s)) via linking In some embodiments, the document may be selected for remote access in its entirety. In some embodiments, the remote access of the document may be allowed through a user interface (e.g., APIs, graphical user interface) that allows for selective sharing of the document. That is, the user interface may allow a user to specify one or more portions of the document (e.g., sections of the document, different layers of the document) for which remote access is allowed and/or one or more other portions of the document for which remote access is not allowed.

In various embodiments, the local replica engine 116 is configured to determine (e.g., find, identify, locate) a local replica of the document in a local database. For example, the computing system 102 may maintain a local replica of a particular document in a database (e.g., the datastore 112), and, responsive to a request for the document from the computing device 122, the computing system 102 can determine the local replica of the particular document in the database. The local replica of the particular document may be linked to a primary replica of the document. The local replica of the particular document may include a snapshot of the primary replica of the particular document. The primary replica of the particular document may be stored in a remote database which may be accessible through the remote server 126. Many variations are possible.

The computing system 102 may be configured to determine the primary replica of the particular document in a remote database. Based on the linking between the local and primary replicas of the particular document (e.g., as indicated in one or more fields of the local replica of the document), the computing system 102 may communicate with the remote server 126 and determine the primary replica of the particular document in the remote database. Such determination of the primary replica of a document may allow for finding a document using the local replica of the document. That is, based on a request for a document from the computing device 122 (e.g., a specific document request, a search request), the local replica engine 116 may find the local replica of the document in the local database, which may then be used to find the primary replica of the document in the remote database.

In various embodiments, the subscription engine 118 is configured to subscribe to the primary replica of the document through the remote server 126. The subscription to the primary replica of the document may be used to provide access to the document to the computing device 122. In some embodiments, the subscription to the primary replica of the document may create a server-client (e.g., master-slave) relationship between the remote server 126 and the computing system 102. In some embodiments, the subscription to the primary replica of the document may create a server-client (e.g., master-slave) relationship between the primary replica of the document and the local replica of the document. That is, the computing system 102, which acts as a server for the computing device 122 requesting the document, may become a client of the remote server 126 for purposes of accessing the primary replica of the document.

In some embodiments, the computing system 102 may subscribe to the primary replica of the document using the same mechanism by which a local user/client of the remote server 126 subscribes to the primary replica of the document.

In some embodiments, the subscription to the primary replica of the document may include one or more updates to the state information for the document. That is, based on the subscription to the primary replica of the document, the computing system 102 may receive changes to the state information (e.g., as reflected in an operation log) for the primary replica of the document. Such changes may be received from the remote server 126, for example. The computing system 102 may receive update(s) to the state information (e.g., additional operations/transactions to be performed) for the document so that the computing system 102 may provide an updated replica of the document to the computing device 122 requesting the document. The computing system 102 may receive updates to the state information once the subscription is established and/or during the subscription. For example, the operation log of the local replica of the document may be synchronized to the operation log of the primary replica of the document upon subscription. As another example, the operation log of the local replica of the document may (continually/periodically) be updated during the subscription so that changes to the primary replica of the document (e.g., changes made at the remote server 126, changes made by other subscribers of the primary replica) are reflected in the operation log of the local replica of the document.

In some embodiments, the subscription to the primary replica of the document may include one or more updates to the snapshot of the primary replica of the document. The computing system 102 may update the snapshot of the primary replica of the document in the local replica of the document while subscribing to the primary replica of the document. The computing system 102 may update the snapshot of the primary replica of the document once the subscription is established and/or during the subscription. For example, the snapshot of the primary replica of the document may be modified based on the state of the primary replica of the document upon subscription. As another example, the snapshot of the primary replica of the document may (continually/periodically) be updated during the subscription so that changes to the primary replica of the document are reflected in the snapshot.

In some embodiments, changes to the snapshot of the primary replica of the document may include changes to stateless information. The primary replica of the document may be changed to include different/additional stateless information, and such stateless information may be provided to the computing system 102 for local storage. For example, the content of the document including a map may be changed to include different/additional image(s) for the map. The computing system 102 may receive the different/additional image(s) for the map for storage in local storage (e.g., within the datastore 112).

Thus, in some embodiments, the subscription to the primary replica of the document may establish a master-slave relationship between the remote server 126 and the computing system 102 and/or between the primary replica of the document and the local replica of the document for a state/stateless information replication framework.

In various embodiments, the access engine 120 is configured to provide access to the document to the computing device 122 based at least in part on the subscription to the primary replica of the document. The access engine 120 may provide the computing device 122 with access to the document based on synchronization of the local replica of the document with the primary replica of the document. For example, a primary replica of a particular document may be stored in a remote database. In this example, based on the request from the computing device 122 request for the particular document, the computing system 102 may subscribe to the primary replica of the document, for example, through the remote server 126. The computing system 102 may also synchronize the local replica of the document with the primary replica of the document. The access to document may be provided to the computing device 122 by providing the computing device 122 with access to the synchronized local replica of the document.

Such synchronization of the different replicas of the document may effectuate pulling data for document updates. In some embodiments, rather than data for document updates being periodically pushed to the computing system 102 by the remote server 126, the document updates may be provided by the remote server 126 to the computing system 102 when the document is accessed through the computing system 102. Such updates may allow for remote access to the updated document whenever connection exists between the computing system 102 and the remote server 126.

Such updates may also reduce the load on periodic updates. For example, the remote server 126 may be configured to provide the computing system 102 with updates to the document at a periodic time interval (e.g., every 24 hours). Based on an access of the document through the computing system 102 between scheduled updates, the local replica of the document (state information, stateless information) may be synchronized to changes in the primary replica of the document. Because updates to the local replica of the document occurred prior to the periodic update, there may be fewer (or no) changes to be updated when the period update time is scheduled to begin.

Such updates may enable reduction on frequency of updates. For example, rather than consuming resources (e.g., computing power, memory, bandwidth) to provide frequent updates to different servers to make sure the users of the different servers are using updated documents, the set interval for periodic updates may be increased because an access of a document from a remote location will cause the local replica of the document to be updated.

In some embodiments, access to the document may be provided to the computing device 122 by loading the document from the primary replica of the document. In some embodiments, rather than loading the local replica of the document, the access engine 120 may, using the subscription to the primary replica of the document, load the primary replica of the document for access by the computing device 122. In such a case, the synchronization of the local replica of the document may occur in parallel/subsequent to providing a view of the document to the computing device 122.

In some embodiments, providing access to the document to the computing device 122 may include use of locally stored stateless information. For example, the document may include one or more layers defined by stateless assets and the provision of the document to the computing device 122 may include provision of locally stored (non-conflicting) stateless assets. Such provision of stateless information may reduce the costs (e.g., network bandwidth, computer processing) required to provide the document to the computing device 122. For example, stateless assets for a document including a map may include one or more satellite images, which may be much larger than state information (operations/transactions on/using the image(s)). The computing system 102 may store these images locally (e.g., datastore 112). In some embodiments, rather than obtaining images from the remote server 126, the computing system 102 may use these locally stored images to provide a view of the map to the computing device 122 instead. Such provision of locally stored stateless information enables users/computing devices to receive latency benefits of using local data and an architectural benefit of modifying the local replica of the map (e.g., inserting a new image, modifying icons, inserting comments/routes).

In some embodiments, providing access to the document to the computing device 122 may include receiving one or more edits to the document from the computing device 122 and sending information describing the edit(s) to the remote server 126. The computing system 102 can receive edit(s) to the document from the computing device 122. Information describing edit(s) to the document (e.g., changes in map inserting a new image, modifying icons, inserting comments/routes) may be cached by the computing system 102 and sent to the remote server 126 for potential modification of the primary replica of the document. The remote server 126 may have ultimate editorial control over the primary replica of the document and may decide which of the modifications received from the computing system 102 will be incorporated into the primary replica of the document.

The linking of documents described herein may enable collaboration of a document by multiple users/computing devices from multiple locations and/or access of a document by a user from multiple locations. For example, users located in different geographic areas may use different servers to access the document. The servers may include local replicas of the document, and the users may access the updated version of the document based on the link between the local and primary replicas of the document. Changes made to the local replicas of the document may be provided to the server with the primary replica of the document for incorporation in the primary replica of the document. As another example, a primary replica of a document may exist in a given database accessible through a given server and a local replica of the document may exist in a particular database accessible through a particular server. The user may access the document when connected to the given server by directly accessing the primary replica of the document. The user may also access the document when connected to the particular server by using the local replica of the document.

The linking of documents described herein may enable creation of dynamic dependencies between documents. For example, a first document may include a map and a second document may include annotations for the map. Copying the annotations from the second document to first given document may allow for static merging of information between the documents. That is, while the first document may be modified to include annotations existing within the second document at a time, subsequent changes to the annotations (or other changes) in the second document may not be reflected in the first document.

In some embodiments, rather than statically copying information from one document into another document, the documents may be linked to dynamically share information between the documents. The linking may include a master-slave linking or a peer linking A master-slave linking may include dynamically importing information from one document (a master document) into another document (a slave document). That is, information is exchanged in one way such that modifications made to the master document are imported into the slave document while modifications made to the slave document are not imported into the master document. A peer linking may include dynamically importing information between multiple documents (a first peer document, a second peer document, and/or other peer documents). That is, information is exchanged in multiple ways such that modifications made to one peer document are imported to other peer document(s). Such dynamic sharing of information may allow use of information from multiple documents in a single document. For example, different documents may be layered on top of each other, a particular document may be used as a reference document, and/or a particular document may be used as a dependency for a document being used. Many variations are possible.

In some embodiments, the access engine 120 may provide information relating to the status of a subscription to the primary replica of the document. For example, if the subscription to the primary replica of the document is effective (e.g., a network connection exists between the computing system 102 and the remote server 126), the access engine 120 may provide information indicating the user is connected to the remote server 126 and/or accessing an updated version of the document. For example, a banner may be displayed indicating the user is connected to the remote server 126 and/or accessing an updated version of the document. For example, if the subscription to the primary replica of the document is broken (e.g., a network connection does exist not between the computing system 102 and the remote server 126), the access engine 120 may provide information that the user is not connected to the remote server 126 and/or is not accessing the updated version of the document and/or is accessing a local replica of the document. For example, a banner may be displayed indicating the user is not connected to the remote server 126 and/or is not accessing the updated version of the document and/or is accessing a local replica of the document.

Because the computing system 102 has been synchronizing the local and primary replicas of the document while the subscription was valid, the user may continue to use the document based on the local replica of the document (e.g., offline mode). When the connection between the computing system 102 and the remote server 126 is reestablished, the changes made by the user during the offline mode may be compared with the primary replica of the document for potential incorporation into the primary replica of the document.

In some embodiments, a user may elect to toggle between connectivity/no connectivity with the primary replica of the document and/or the remote server 126. Such election may allow the user to use/make changes to the document which may not be reflected back to the primary replica of the document. For example, a user may use such a feature to disconnect connectivity and make edits that will not be seen by other collaborators of the document until connectivity is restored.

The dynamic synchronization of the different replicas of a document may increase user trust pertaining to use of the document. For example, if the different replicas of a document are only updated at a certain interval, a user of a local replica of the document may be uncertain as to whether the user is using an updated version of the document. Different servers may be updated at different times and a user may see different versions of the document depending on which server was used to access the document. A user may be unsure if the user is using an outdated version of the map. The dynamic synchronization of the different replicas of the document may allow a user to know that the user is using an updated version of the map. In some embodiments, an alert may be provided when the document is stale or not up-to-date based on information relating to a status of the subscription to the primary replica of the document.

In some implementations, providing access to the document to the computing device 122 may include restricting access based on permissions. For example, one or more portions of the document may be restricted based on sensitivity, classification, and/or other factors, and remote access of the document through the computing system 102 may be limited based on the access level of the user/computing device 122.

In some implementations, the computing device 122 may be logged into the computing system 102 using a given credential (e.g., token) and this credential may be used to validate access to the primary replica of the document by the computing system 102 and through the remote server 126. The given credential may be validated based on trust relationships between an exchanger and one or more authentication processes (e.g., authentication servers). The exchanger may allow sharing of authentication/authorization between different authentication processes. Such validation of the computing device 122 may allow a user of the computing device 122 to access the primary replica of the document by going through an authentication/authorization process for the computing system 102 and without going through a separate authentication/authorization process for the remote server 126.

Lacking such validation of the computing device 122 may require the user to go through authentication/authorization process multiple times. For example, the user may be required to be authenticated/authorized when the user logs into the computing system 102 and again when authenticated/authorized the computing system 102 communicates with the remote server 126. For example, the user may be required to provide login information when the user connects to the computing system 102 and when the computing system 102 connects to the remote server 126 (e.g., for subscription to the primary replica of the document). Requiring users to repeatedly provide their login information may create a frustrating user experience.

In some embodiments, credentials for users/computing devices may be stored for reuse. For example, the computing system 102 and the remote server 126 may disconnect (e.g., due to network partition), and the computing system 102 may provide a view of a document requested by the computing device 122 using a local replica of the document. When the connection between the computing system 102 and the remote server 126 is restored, a stored credential may be used to restore the subscription of the computing system 102 to the primary replica of the document through the remote server 126. Such resiliency may allow for a user/computing device 122 to prevent being logged off when connection to the remote server 126 is disconnected.

Figure 2:
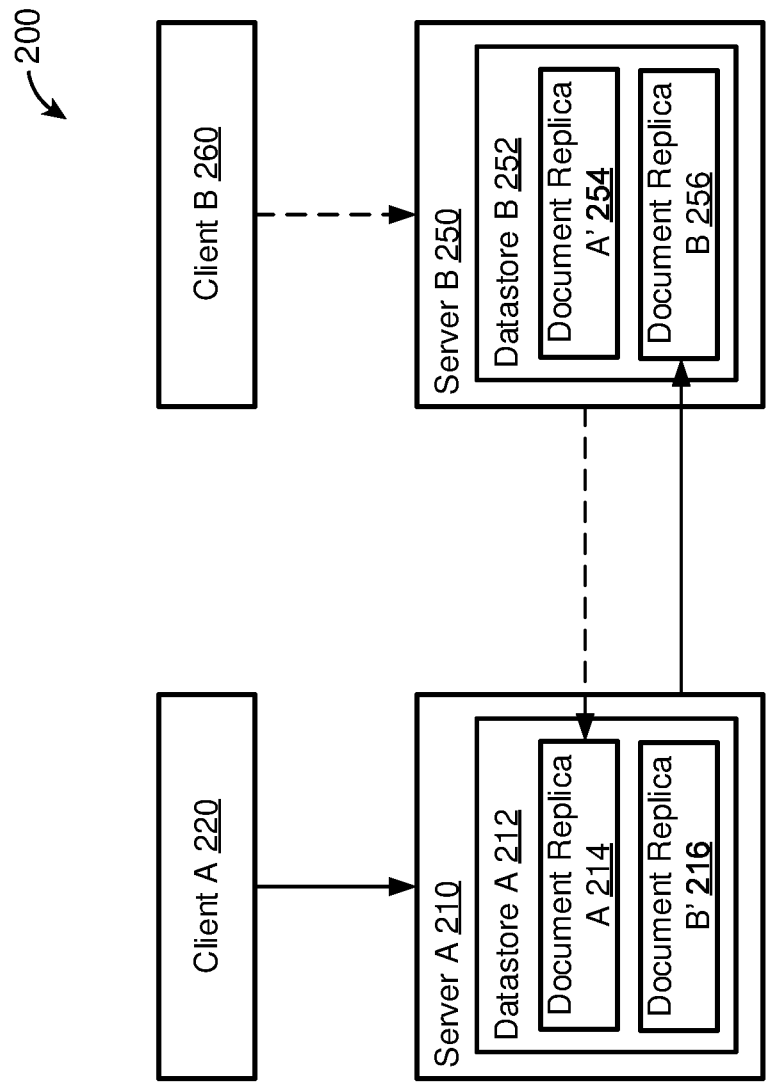
FIG. 2 illustrates an example diagram, in accordance with various embodiments.

FIG. 2 illustrates an example diagram 200, in accordance with various embodiments. The example diagram 200 may include a server A 210, a client A 220, a server B 250, and a client B 260. The server A 210, the client A 220, the server B 250, and the client B 260 may include one or more processors and memory. The processor(s) may be configured to perform various operations by interpreting machine-readable instructions stored in the memory. The client A 220 and/or the client B 260 may include a computing device (e.g., desktop device, laptop, mobile device). The client A 220 may communicate with the server A 210 (e.g., the client A 220 is logged into the server A 210) and the client B 260 may communicate with the server B 250 (e.g., the client B 260 is logged into the server B 250).

The server A 210 may include a datastore A 212. In some embodiments, the server A 210 may be configured to implement some, or all, of the functionalities of the computing system 102 as described above. The datastore A 212 may include one or more databases (e.g., storing document information, such as state information, stateless information, operation logs). The datastore A 212 may include a primary replica of a document A (e.g., a document replica A 214) and a local replica of a document B (e.g., a document replica B' 216). The document replica B' 216 may be linked to the document replica B 256. The document replica B' 216 may include one or more fields that identify or reference the document replica B 256. The document replica B' 216 may include a snapshot of the document replica B 256.

The server B 250 may include a datastore B 252. In some embodiments, the server B 250 may be configured to implement some, or all, of the functionalities of the computing system 102 as described above. The datastore B 252 may include one or more databases (e.g., storing document information, such as state information, stateless information, operation logs). The datastore B 252 may include a local replica of the document A (e.g., a document replica A' 254) and a primary replica of the document B (e.g., a document replica B 256). The document replica A' 254 may be linked to the document replica A 214. The document replica A' 254 may include one or more fields that identify or reference the document replica A 214. The document replica A' 254 may include a snapshot of the document replica A 214.

The server A 210 may have ultimate editorial control over the document A. The server A 210 may exercise ultimate editorial control over the document A based on control over the content of the document replica A 214. The server B 250 may have ultimate editorial control over the document B. The server B 250 may exercise ultimate editorial control over the document B based on control over the content of the document replica B 256.

The server A 210 may receive one or more requests for documents from the client A 220. Based on a request for document A, the server A 210 may provide to the client A 220 the document replica A 214. Based on a request for document B, the server A 210 may determine the document replica B' 216 (the local replica of the document B in the datastore A 212) and subscribe to the document replica B 256 (the primary replica of the document B in the datastore B 252) through the server B 250 (remote server). The subscription to the document replica B 256 may create a server-client (e.g., master-slave) relationship between the server B 250 and the server A 210 and/or between the document replica B 256 and the document replica B' 216. The server A 210 may provide to the client A 220 access to the document B based at least in part on the subscription to the document replica B 256.

The server B 250 may receive one or more requests for documents from the client B 260. Based on a request for document A, the server B 250 may determine the document replica A' 254 (the local replica of the document A in the datastore B 252) and subscribe to the document replica A 214 (the primary replica of the document A in the datastore A 212) through the server A 210 (remote server). The subscription to the document replica A 214 may create a server-client (e.g., master-slave) relationship between the server A 210 and the server B 250 and/or between the document replica A 214 and the document replica A' 254. The server B 250 may provide to the client B 260 access to the document A based at least in part on the subscription to the document replica A 214. Based on a request for document B, the server B 250 may provide to the client B 260 the document replica B 256.

Figure 3:
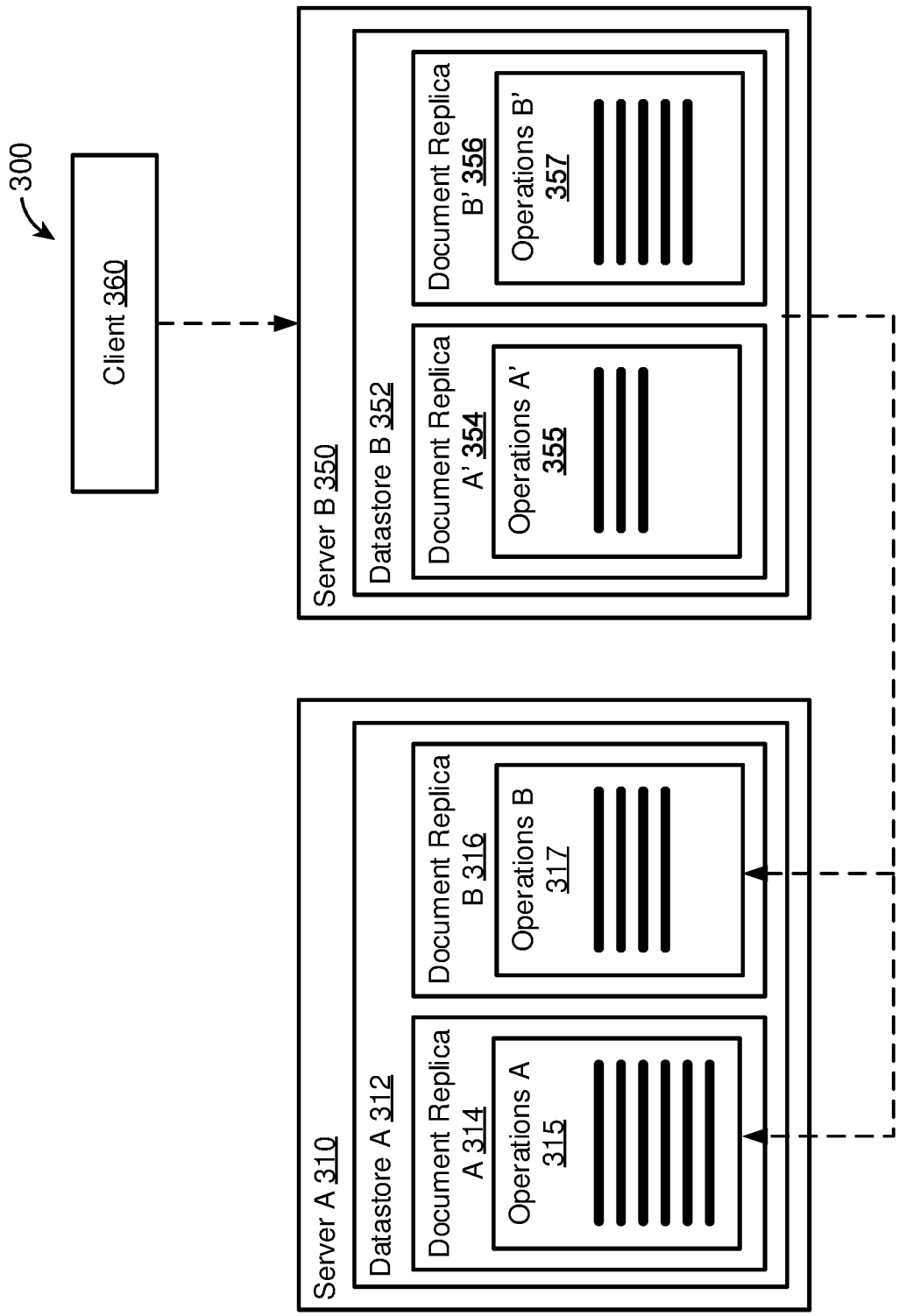
FIG. 3 illustrates another example diagram, in accordance with various embodiments.

FIG. 3 illustrates an example diagram 300, in accordance with various embodiments. The example diagram 300 may include a server A 310, a server B 350, and a client 360. The server A 310, the server B 350, and the client 360 may include one or more processors and memory. The processor(s) may be configured to perform various operations by interpreting machine-readable instructions stored in the memory. The client 360 may include a computing device (e.g., desktop device, laptop, mobile device). The client 360 may communicate with the server B 350 (e.g., the client 360 is logged into the server B 350).

The server A 310 may include a datastore A 312. In some embodiments, the server A 310 may be configured to implement some, or all, of the functionalities of the computing system 102 and/or the server A 210 as described above. The datastore A 312 may include one or more databases (e.g., storing document information, such as state information, stateless information, operation logs). The datastore A 312 may include a primary replica of a document A (a document replica A 314) and a primary replica of a document B (a document replica B 316).

The server B 350 may include a datastore B 352. In some embodiments, the server B 350 may be configured to implement some, or all, of the functionalities of the computing system 102 and/or the server B 250 as described above. The datastore B 352 may include one or more databases (e.g., storing document information, such as state information, stateless information, operation logs). The datastore B 352 may include a local replica of the document A (a document replica A' 354) and a local replica of the document B (a document replica B' 356). The document replica A' 354 may be linked to the document replica A 314. The document replica A' 354 may include one or more fields that identify or reference the document replica A 314. The document replica A' 354 may include a snapshot of the document replica A 314. The document replica B' 356 may be linked to the document replica B 316. The document replica B' 356 may include one or more fields that identify or reference the document replica B 316. The document replica B' 356 may include a snapshot of the document replica B 316.

The server A 310 may have ultimate editorial control over the document A and the document B. The server A 310 may exercise ultimate editorial control over the document A based on control over the content of the document replica A 314. The server A 310 may exercise ultimate editorial control over the document B based on control over the content of the document replica B 316.

The server B 350 may receive one or more requests for documents from the client 360. Based on a request for document A, the server B 350 may determine the document replica A' 354 (the local replica of the document A in the datastore B 352) and subscribe to the document replica A 314 (the primary replica of the document A in the datastore A 312) through the server A 310 (remote server). The server B 350 may provide to the client 360 access to the document A based at least in part on the subscription to the document replica A 314. Based on a request for document B, the server B 350 may determine the document replica B' 356 (the local replica of the document B in the datastore B 352) and subscribe to the document replica B 316 (the primary replica of the document B in the datastore A 312) through the server A 310 (remote server). The server B 350 may provide to the client 360 access to the document B based at least in part on the subscription to the document replica B 316.

The content of the document replica A 314 may be defined at least in part based on state information, such as operations A 315 (e.g., as recorded within an operation log for the document replica A 314). The content of the document replica A' 354 may be defined at least in part based on state information, such as operations A' 355 (e.g., as recorded within an operation log for the document replica A' 354). In some embodiments, the operations A' 355 may be synchronized with the operations A 315 based on the subscription to the document replica A 314 by the server B 350. For example, the operations A 315 may include three new operations/transactions (e.g., three operations/transactions were added to the operations A 315 since the operations A 315 and the operations A' 355 were synchronized), which may be copied to the operations A' 355. The updated operations A' 355 may be used by the server B 350 to provide to the client 360 access to the document A.

The content of the document replica B 316 may be defined at least in part based on state information, such as operations B 317 (e.g., as recorded within an operation log), for the document replica B 316. The content of the document replica B' 356 may be defined at least in part based on state information, such as operations B' 357 (e.g., as recorded within an operation log), for the document replica B' 356. In some embodiments, the operations B' 357 may be synchronized with the operations B 317 based on the subscription to the document replica B 316 by the server B 350. For example, the operations B 317 may include one less operation/transaction (e.g., an operation/transaction was removed from the operations B 317 or an unauthorized change was made to the operations B' 357 since the operations B 317 and the operations B' 357 were synchronized), and the additional operation/transaction may be removed from the operations B' 357. As another example, the additional operation/transaction in the operations B' 357 may have been authorized and the operations B 317 may be updated to include the additional operation/transaction. The updated operations B' 357 may be used by the server B 350 to provide to the client 360 access to the document B. Many variations are possible.

Figure 4:
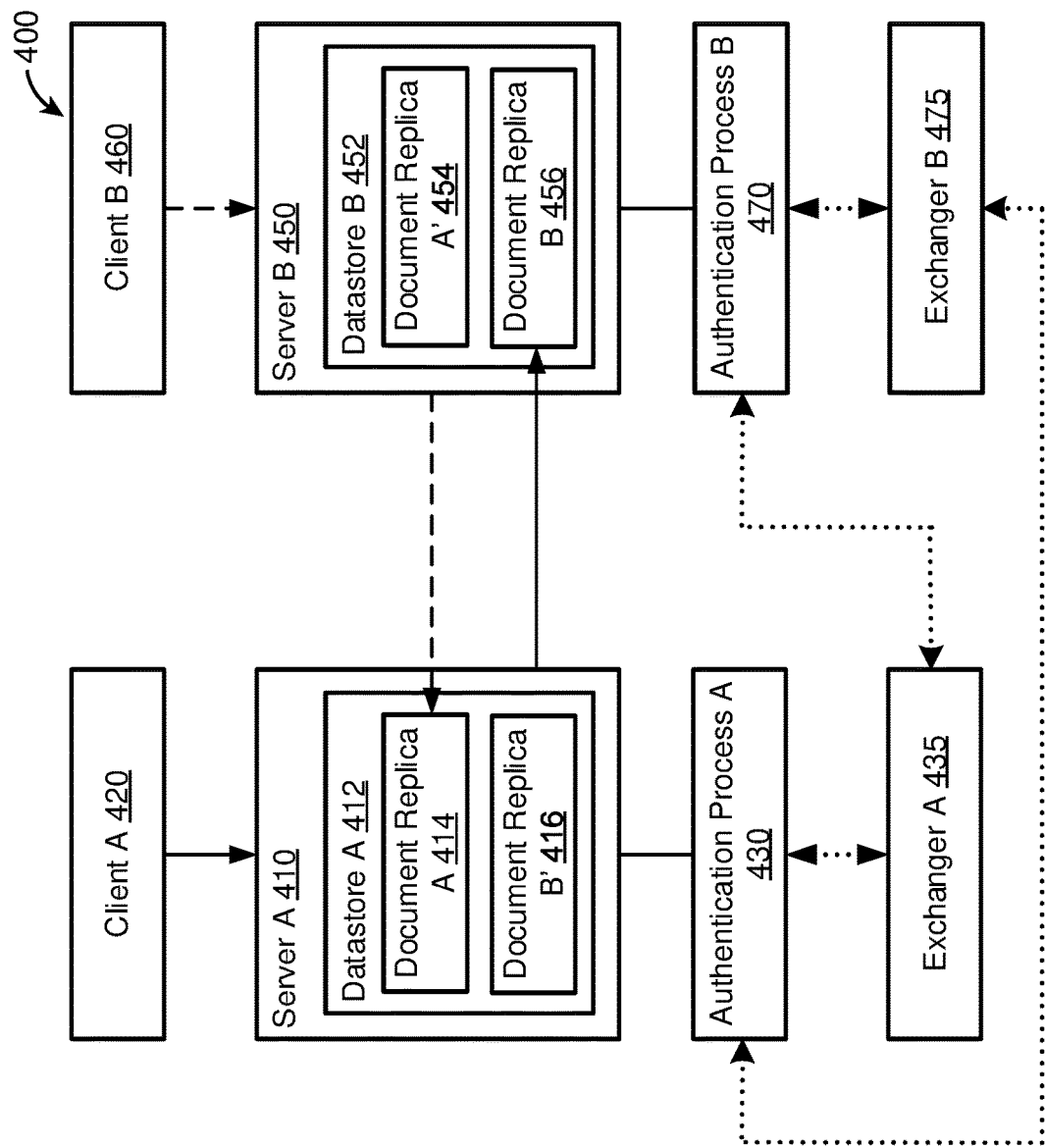
FIG. 4 illustrates yet another example diagram, in accordance with various embodiments.

FIG. 4 illustrates an example diagram 400, in accordance with various embodiments. The example diagram 400 may include a server A 410, a client A 420, a server B 450, and a client B 460. The server A 410, the client A 420, the server B 450, and the client B 460 may include one or more processors and memory. The processor(s) may be configured to perform various operations by interpreting machine-readable instructions stored in the memory. The client A 420 and/or the client B 460 may include a computing device (e.g., desktop device, laptop, mobile device). The client A 420 may communicate with the server A 410 (the client A 420 is logged into the server A 410) and the client B 460 may communicate with the server B 450 (the client B 460 is logged into the server B 450).

The server A 410 may include a datastore A 412. In some embodiments, the server A 410 may be configured to implement some, or all, of the functionalities of the computing system 102, the server A 210, and/or the server A 310 as described above. The datastore A 412 may include a primary replica of a document A (a document replica A 414) and a local replica of a document B (a document replica B' 416). The server B 450 may include a datastore B 452. In some embodiments, the server B 450 may be configured to implement some, or all, of the functionalities of the computing system 102, the server B 250, and/or the server B 350 as described above. The datastore B 452 may include a local replica of the document A (a document replica A' 454) and a primary replica of the document B (a document replica B 256).

Based on a request from the client A 420 for the document B 456, the server A 410 may determine the document replica B' 416 (the local replica of the document B 456 in the datastore A 412) and subscribe to the document replica B 456 (the primary replica of the document B in the datastore B 452) through the server B 450 (remote server). Based on a request from the client B 460 for the document A 414, the server B 450 may determine the document replica A' 454 (the local replica of the document A 414 in the datastore B 452) and subscribe to the document replica A 414 (the primary replica of the document A in the datastore A 412) through the server A 410 (remote server).

The client A 420 may be logged into the server A 410 using a given credential (e.g., token), and access to the document replica B 456 (the primary replica of the document B in the datastore B 452) by server A 410 and through the server B 450 (remote server) may be validated using the given credential. The given credential may be validated based on trust relationships between an exchanger A 435 and authentication processes 430, 470 (e.g., authentication servers). The exchanger A 435 may allow sharing of authentication/authorization between different authentication processes 430, 470. Such validation of the client A 420 may allow a user of the client A 420 to access the document replica B 456 by going through an authentication/authorization process for the server A 410 and without having to go through a separate authentication/authorization process for the server B 450.

The client B 460 may be logged into the server B 450 using a given credential (e.g., token), and access to the document replica A 414 (the primary replica of the document A in the datastore A 412) by the server B 450 and through the server A 410 (remote server) may be validated using the given credential. The given credential may be validated based on trust relationships between an exchanger B 475 and authentication processes 430, 470 (e.g., authentication servers). The exchanger B 475 may allow sharing of authentication/authorization between different authentication processes 430, 470. Such validation of the client B 460 may allow a user of the client B 460 to access the document replica A 414 by going through an authentication/authorization process for the server B 450 and without having to go through a separate authentication/authorization process for the server A 410.

In some implementations, the authentication processes 430, 470 may communicate with another service (e.g., third-party authentication service) which may perform the authentication/authorization. For example, both the authentication process A 430 and the authentication process B 470 may use the same authentication/authorization server to validate a user's login to the servers 410, 450. The user's login process may result in generation of a credential for the user, which may be effective for a limited period of time or for an indefinite period of time. Cryptographically secure trust relationships may be established between the authentication processes 430, 470 (via the exchanger A 435, the exchanger B 475) to allow credentials to be exchanged. There may be trusted pairwise relationships between an exchanger and individual authentication processes to which the exchanger is authorized to authenticate credentials. For example, trusted pairwise relationships may exist between the exchanger A 435 and the authentication process A 430, the exchanger A 435 and the authentication process B 470, the exchanger B 475 and the authentication process A 430, and the exchanger B 475 and the authentication process B 470.

For example, the client A 420 may have logged into the server A 410 via the authentication process A 430, which may have resulted in generation of a credential for the client A 420 by the authentication process A 430. Based on a request for document B by the client A 420, the server A 410 may seek to subscribe to the document replica B 456 accessible through the server B 450. The server A 410 may provide the credential for the client A 420 to the server B 450. The server B 450 may query the authentication process B 470 to determine whether the received credential is valid (i.e., check whether the client A 420 is authorized to access the server B 450). The authentication process B 470 may not recognize this credential because it was not used in the login process involving the client A 420 and the server A 410. The authentication process B 470 may query the exchanger B 475 to determine whether the credential is valid. The exchanger B 475 may in turn query the authentication process A 430 (e.g., source authentication server) to determine whether the received credential is valid (i.e., check whether the client A 420 has valid access to the server A 410). Based on the credential being validated by the authentication process A 430, access of the credential may be validated for access of the server B 450.

In some embodiments, the authentication process B 470 may generate a shell credential for use based on receiving a credential generated by another authentication process. This may result in exchanging a credential from another authentication process with an internal credential. The shell credential may use the original credential expiry date so that they expire at the same time.

Figure 5:
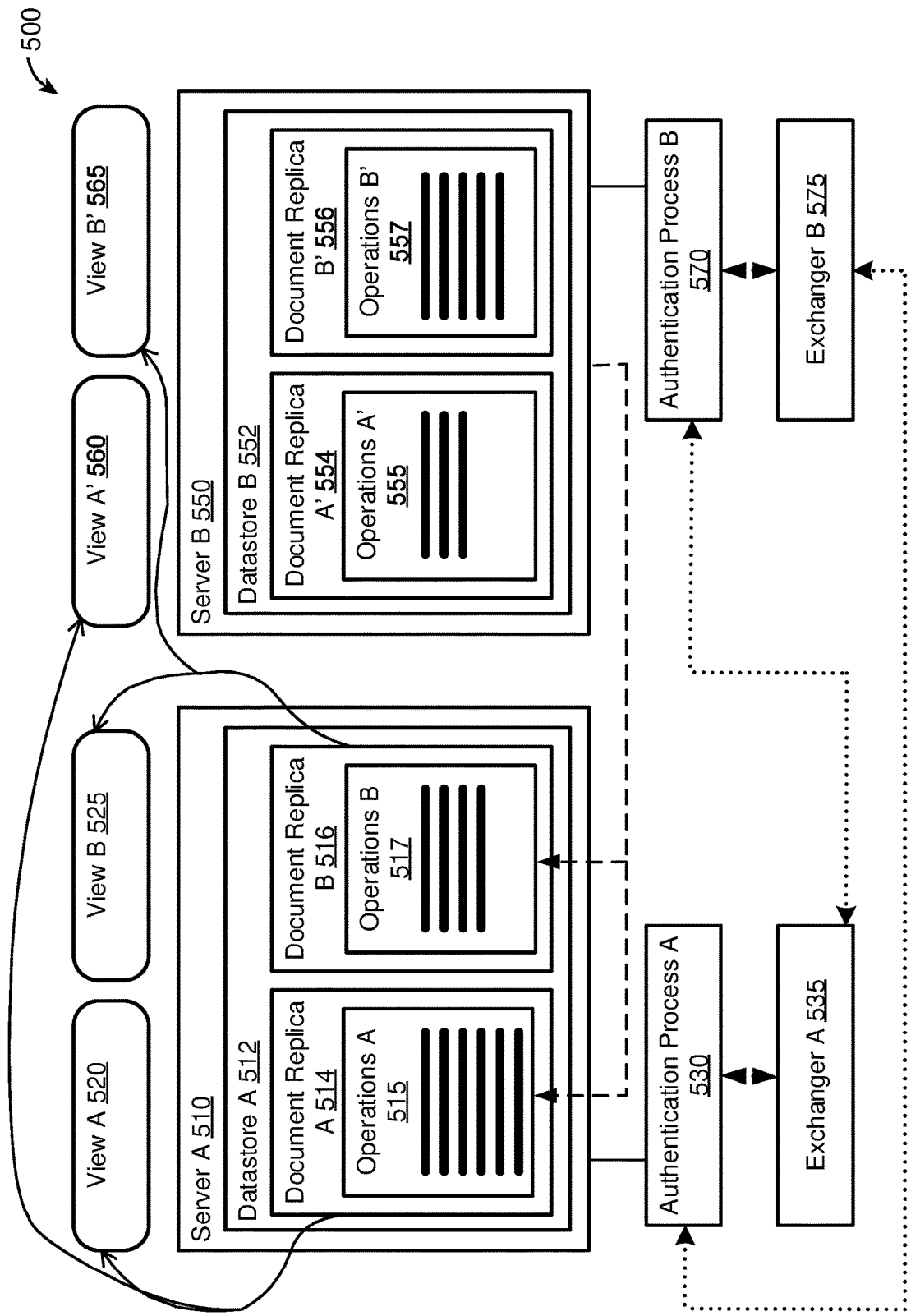
FIG. 5 illustrates a further example diagram, in accordance with various embodiments.

FIG. 5 illustrates an example diagram 500, in accordance with various embodiments. The example diagram 500 may include a server A 510, a server B 550, an authentication process A 530, an authentication processor B 570, an exchanger A 535, and an exchanger B 575. The server A 510 and the server B 550 may include one or more processors and memory. The processor(s) may be configured to perform various operations by interpreting machine-readable instructions stored in the memory. The server A 510 may include a datastore A 512. In some embodiments, the server A 510 may be configured to implement some, or all, of the functionalities of the computing system 102, the server A 210, the server A 310, and/or the server A 410 as described above. The datastore A 512 may include a primary replica of a document A (a document replica A 514) and a primary replica of a document B (a document replica B 516). The server B 550 may include a datastore B 552. In some embodiments, the server B 550 may be configured to implement some, or all, of the functionalities of the computing system 102, the server B 250, the server B 350, and/or the server B 450 as described above. The datastore B 552 may include a local replica of a document A (a document replica A' 554) and a local replica of a document B (a document replica B' 556).

The content of the document replica A 514 may be defined at least in part based on state information, such as operations A 515 (e.g., as recorded within an operation log for the document replica A 514). The content of the document replica A' 554 may be defined at least in part based on state information, such as operations A' 555 (e.g., as recorded within an operation log for the document replica A' 554). The content of the document replica B 516 may be defined based at least in part on state information, such as operations B 517 (e.g., as recorded within an operation log for the document replica B 516). The content of the document replica B' 556 may be defined based at least in part on state information, such as operations B' 557 (e.g., as recorded within an operation log for the document replica B' 556).

A client may log into the server A 510 through the authentication process A 530 (e.g., an authentication server). In some embodiments, the authentication process A 530 may be configured to implement some, or all, of the functionalities of the authentication process A 430 as described above. A trust relationship may exist between the exchanger A 535 and the authentication process A 530. A trust relationship may exist between the exchanger A 535 and the authentication process B 570. In some embodiments, the exchanger A 535 may be configured to implement some, or all, of the functionalities of the exchanger A 435 as described above. Trusted pairwise relationships may exist between the exchanger A 535 and the authentication process A 530, the exchanger A 535 and the authentication process B 570, the exchanger B 575 and the authentication process A 530, and the exchanger B 575 and the authentication process B 570.

A client may log into the server B 550 through the authentication process B 570 (e.g., an authentication server). In some embodiments, the authentication process B 570 may be configured to implement some, or all, of the functionalities of the authentication process B 470 as described above. A trust relationship may exist between the exchanger B 575 and the authentication process A 530. A trust relationship may exist between the exchanger B 575 and the authentication process B 570. In some embodiments, the exchanger B 575 may be configured to implement some, or all, of the functionalities of the exchanger B 475 as described above.

One or more clients may be logged into the server A 510. Access by the client(s) of the server A 510 of the document A may include a view A 520 of the document replica A 514. Access by the client(s) of the server A 510 of the document B may include a view B 525 of the document replica B 516.

One or more clients may be logged into the server B 550. Access by the client(s) of the server B 550 to the document A may include a view A' 560 of the document replica A 514 based on the linking between the document replica A 514 and the document replica A' 554. Based on the linking between the document replica A 514 and the document replica A' 554, the server B 550 may subscribe to the document replica A 514 through the server A 510 and can provide the view A' 560 to its client(s) based at least in part on the subscription to the document replica A 514. Access by the client(s) of the server B 550 of the document B may include a view B' 565 of the document replica B 516 based on the linking between the document replica B 516 and the document replica B' 556. Based on the linking between the document replica B 516 and the document replica B' 556, the server B 550 may subscribe to the document replica B 516 through the server A 510 and can provide the view B' 565 to its client(s) based at least in part on the subscription to the document replica B 516. Many variations are possible.

Figure 6:
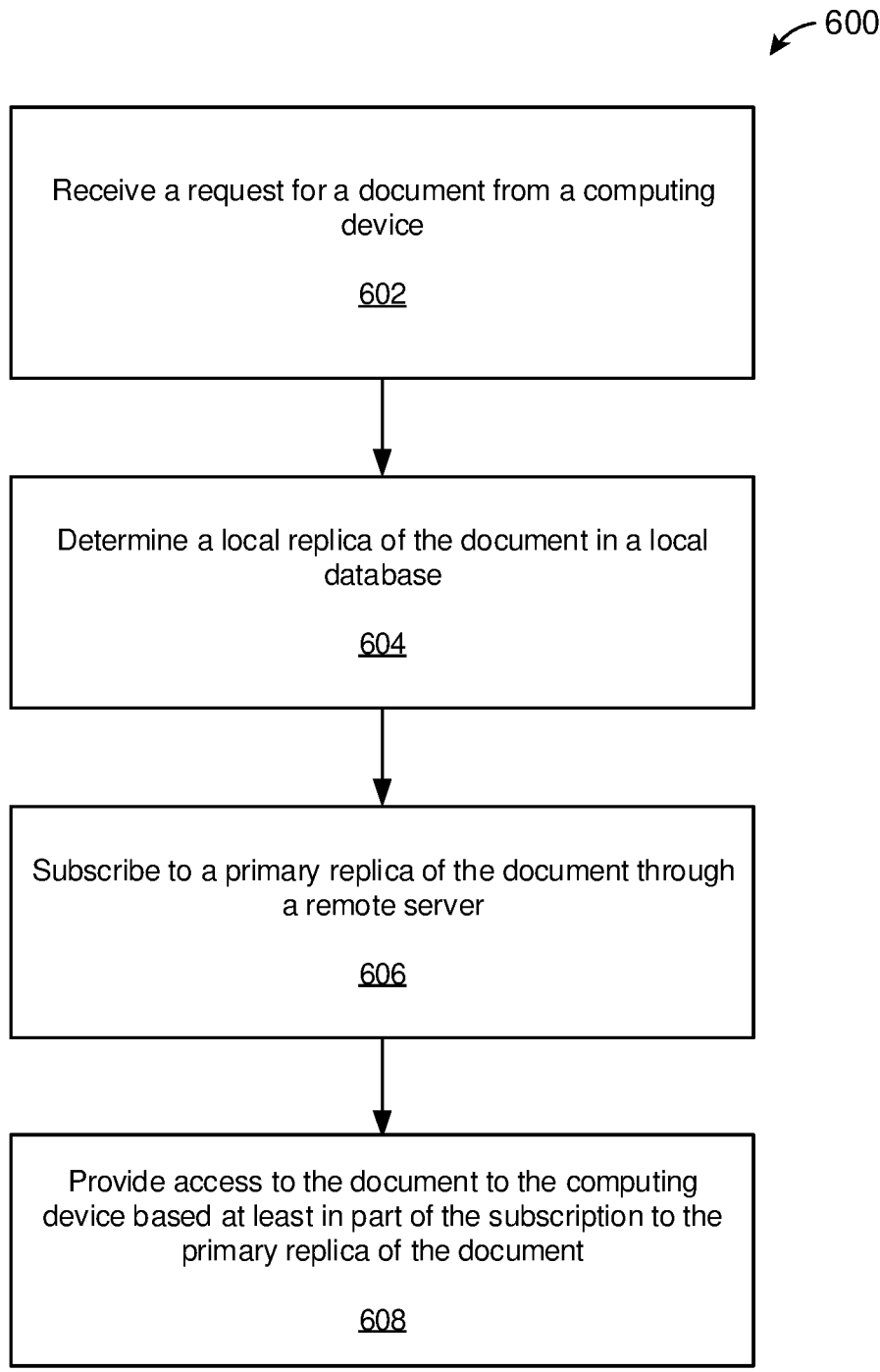
FIG. 6 illustrates a flowchart of an example method, in accordance with various embodiments.

FIG. 6 illustrates a flowchart of an example method 600, according to various embodiments of the present disclosure. The method 600 may be implemented in various environments including, for example, the environment 100 of FIG. 1. The operations of method 600 presented below are intended to be illustrative. Depending on the implementation, the example method 600 may include additional, fewer, or alternative steps performed in various orders or in parallel. The example method 500 may be implemented in various computing systems or devices including one or more processors.

At block 602, a request for a document may be received from a computing device. Content of the document may be defined based on state information and stateless information. At block 604, a local replica of the document may be determined in a local database. The local replica of the document may be linked to a primary replica of the document and include a snapshot of the primary replica of the document. The primary replica of the document may be stored in a remote database that is accessible through a remote server. At block 606, the primary replica of the document may be subscribed to through the remote server. At block 608, access to the document may be provided to the computing device based at least in part of the subscription to the primary replica of the document.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
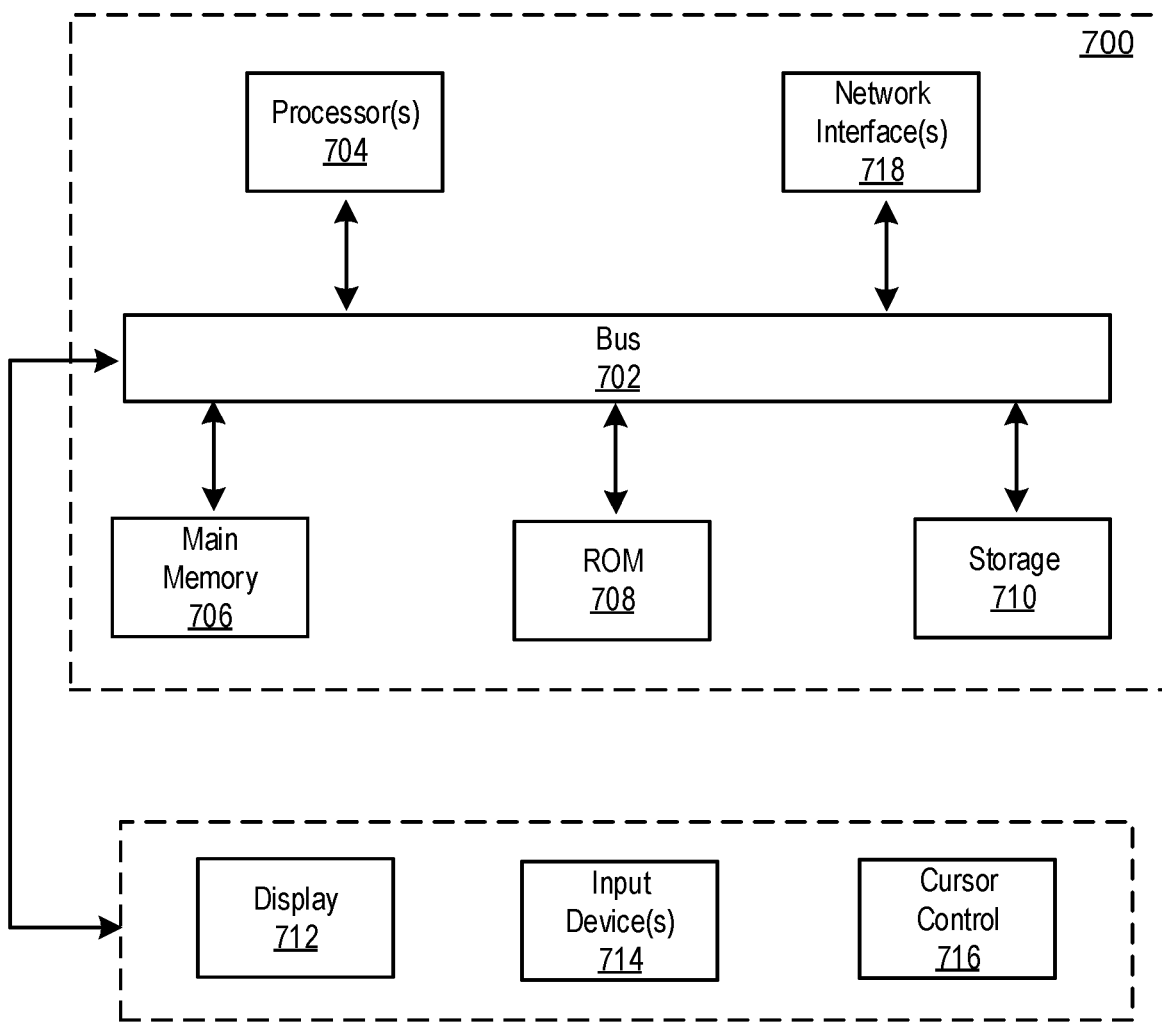
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
   one or more processors; and
   a memory storing instructions that, when executed by the one or more processors, cause the system to perform:
      receiving an indication to toggle from an unconnected status between a first computing device and one or more second computing devices to a connected status;
      in response to toggling to the connected status:
         linking a first local replica of a document to one or more second local replicas of the document, wherein the first local replica of the document is associated with the first computing device and the one or more second local replicas are associated with the one or more second computing devices, wherein the linking enables dynamic dependencies between the first local replica of the document and the one or more second local replicas of the document;
         receiving an indication of a first update to the first local replica of the document from the first computing device, wherein the first local replica of the document is linked to a primary replica, and one or more fields of the first local replica of the document identify or reference the primary replica, wherein the first update is recorded in a first operation log associated with the first local replica;
         determining whether the first update is confirmed; and
         based on whether the first update is confirmed, selectively implementing the first update.

2. The system of claim 1, wherein the second computing device determines whether to confirm any updates to the document from a different replica.

3. The system of claim 1, wherein the instructions further cause the system to perform:
   receiving an indication that the second computing device confirms a second update to the document; and
   implementing the second update to the document at the system.

4. The system of claim 1, wherein the document comprises stateless information that is locally stored.

5. The system of claim 4, wherein the stateless information corresponds to content of the document that does not change with the first update to the first operation log.

6. The system of claim 1, wherein the system is associated with a third replica of the document, the third replica comprising the primary replica, and
   the instructions further cause the system to perform:
      receiving an edit to the document from the first computing device; and
      transmitting information describing the edit to the system, the system having editorial control over the third replica of the document.

7. The system of claim 1, wherein the first computing device is logged into the system using a credential, and system access to the third replica of the document through the system is validated using the credential.

8. The system of claim 7, wherein the credential is validated based on trust relationships between an exchanger and authentication processes.

9. The system of claim 1, wherein the document includes a map, and wherein the stateless information corresponds to media content items associated with one or more locations on the map and state information corresponds to annotations associated with the one or more locations.

10. The system of claim 9, wherein the media content items include at least one of images, video, or audio associated with the one or more locations and the annotations include at least one route overlaid over the one or more locations.

11. A method implemented by a computing system including one or more processors and storage media storing machine-readable instructions, wherein the method is performed using the one or more processors, the method comprising:
   receiving an indication to toggle from an unconnected status between a first computing device and one or more second computing devices to a connected status;
   in response to toggling to the connected status:
      linking a first local replica of a document to one or more second local replicas of the document, wherein the first local replica of the document is associated with the first computing device and the one or more second local replicas are associated with the one or more second computing devices, wherein the linking enables dynamic dependencies between the first local replica of the document and the one or more second local replicas of the document;

receiving an indication of a first update to the first local replica of the document from the first computing device, wherein the first local replica of the document is linked to a primary replica, and one or more fields of the first local replica of the document identify or reference the primary replica, wherein the first update is recorded in a first operation log associated with the first local replica;

determining whether the first update is confirmed; and based on whether the first update is confirmed, selectively implementing the first update.

12. The method of claim 11, wherein the second computing device determines whether to confirm any updates to the document from a different replica.

13. The method of claim 11, further comprising:

receiving an indication that the second computing device confirms a second update to the document; and implementing the second update to the document at the system.

14. The method of claim 11, wherein the document comprises stateless information that is locally stored.

15. The method of claim 11, wherein the one or more processors are associated with a third replica of the document, the third replica comprising the primary replica, and the method further comprises:

receiving an edit to the document from the first computing device; and transmitting information describing the edit to the system, the one or more processors having editorial control over the third replica of the document.

16. A non-transitory computer readable medium comprising instructions that, when executed, cause one or more processors to perform:

receiving an indication to toggle from an unconnected status between a first computing device and one or more second computing devices to a connected status;

in response to toggling to the connected status:

linking a first local replica of a document to one or more second local replicas of the document, wherein the first local replica of the document is associated with the first computing device and the one or more second local replicas are associated with the one or more second computing devices, wherein the linking enables dynamic dependencies between the first local replica of the document and the one or more second local replicas of the document;

receiving an indication of a first update to the first local replica of the document from the first computing device, wherein the first local replica of the document is linked to a primary replica, and one or more fields of the first local replica of the document identify or reference the primary replica, wherein the first update is recorded in a first operation log associated with the first local replica;

determining whether the first update is confirmed; and based on whether the first update is confirmed, selectively implementing the first update.

17. The non-transitory computer readable medium of claim 16, wherein the second computing device determines whether to confirm any updates to the document from a different replica.

18. The non-transitory computer readable medium of claim 16, wherein the instructions further cause the one or more processors to perform:

receiving an indication that the second computing device confirms a second update to the document; and implementing the second update to the document at the system.

19. The non-transitory computer readable medium of claim 16, wherein the document comprises stateless information that is locally stored.

20. The non-transitory computer readable medium of claim 16, wherein the one or more processors are associated with a third replica of the document, the third replica comprising the primary replica, and the instructions further cause the one or more processors to perform:

receiving an edit to the document from the first computing device; and transmitting information describing the edit to the system, the one or more processors having editorial control over the third replica of the document.

* * * * *